US006436532B1

(12) United States Patent
Moon et al.

(10) Patent No.: US 6,436,532 B1
(45) Date of Patent: Aug. 20, 2002

(54) MULTI-STAGE IRRADIATION PROCESS FOR PRODUCTION OF ACRYLIC BASED ADHESIVES AND ADHESIVES MADE THEREBY

(75) Inventors: John D. Moon, Hastings; Louise A. Ziegler, Minneapolis, both of MN (US); George F. Vesley, Hudson, WI (US); Robert C. Mehner, Oakdale, MN (US); Mark S. Edberg, Centerville, MN (US); Robert D. Anderson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 09/761,370

(22) Filed: Jan. 16, 2001

Related U.S. Application Data

(63) Continuation of application No. 08/131,037, filed on Oct. 4, 1993, now Pat. No. 6,339,111, which is a continuation-in-part of application No. 07/662,122, filed on Feb. 28, 1991, now abandoned.

(51) Int. Cl.$^7$ .............................................. B32B 27/16
(52) U.S. Cl. .................... 428/355 AC; 522/4; 427/54.1
(58) Field of Search ...................... 428/355 AC; 522/4; 427/54.1

(56) References Cited

U.S. PATENT DOCUMENTS

| 3,615,972 A | 10/1971 | Morehouse et al. |
| 3,897,295 A | 7/1975 | Dowbenko et al. |
| 4,075,238 A | 2/1978 | Mark et al. |
| 4,181,752 A | 1/1980 | Martens et al. |
| 4,287,308 A | 9/1981 | Nakayama et al. |
| 4,329,384 A | 5/1982 | Vesley et al. |
| 4,330,500 A | 5/1982 | Mackes |
| 4,379,201 A | 4/1983 | Heilmann et al. |
| 4,404,073 A | 9/1983 | Bartissol et al. |
| 4,415,615 A | 11/1983 | Esmay et al. |
| 4,710,536 A | 12/1987 | Klingen et al. |
| 4,749,590 A | 6/1988 | Klingen et al. |
| 4,762,802 A | 8/1988 | Parrillo |
| 4,762,862 A | 8/1988 | Yada |
| 6,174,931 B1 | 1/2001 | Moon et al. |
| 6,339,111 B1 * | 1/2002 | Moon et al. .................. 522/4 |

FOREIGN PATENT DOCUMENTS

| GB | 1241823 | 7/1968 |
| JP | 49-5145 | 5/1972 |
| JP | 55-50002 | 4/1980 |
| JP | 62-235305 | 10/1987 |
| JP | 63-214484 | 8/1988 |
| JP | 63-262583 | 10/1988 |
| JP | 2-60981 | 3/1990 |
| JP | 2-110180 | 4/1990 |
| JP | 4-4277 | 1/1992 |
| JP | 5-179208 | 7/1993 |

* cited by examiner

*Primary Examiner*—Robert Dawson
*Assistant Examiner*—Christopher M. Keehan
(74) *Attorney, Agent, or Firm*—Daniel R. Pastirik

(57) ABSTRACT

Disclosed is a novel, multi-stage irradiation process for the production of an acrylic-based adhesive or pressure-sensitive adhesive tape. The first irradiation step or stage employs electromagnetic radiation at a relatively low average intensity (i.e., 0.1 to 20 mW/cm$^2$) and the subsequent step employs electromagnetic radiation at a relatively higher average intensity (i.e., greater than 20 mW/cm$^2$.) Also disclosed are acrylic-based psa tape materials made by the novel process.

23 Claims, No Drawings

MULTI-STAGE IRRADIATION PROCESS FOR PRODUCTION OF ACRYLIC BASED ADHESIVES AND ADHESIVES MADE THEREBY

This is a continuation of application Ser. No. 08/131,037 filed Oct. 4, 1993, now U.S. Pat No. 6,339,111, which application is a continuation-in-part application of U.S. application Ser. No. 07/662,122, filed Feb. 28, 1991, now abandoned.

FIELD OF THE INVENTION

This invention relates to a process for the production of adhesives and more particularly, it relates to a multi-stage irradiation process for the production of acrylic-based adhesives, especially pressure-sensitive adhesive tapes. It also relates to acrylic-based adhesives and tapes made by the novel processes of this invention.

BACKGROUND OF THE INVENTION

It is known in the literature and in the industry that there are at least four different feasible methods for the production of acrylic-based pressure-sensitive adhesive (hereinafter "psa") tapes. These known methods include solution polymerization, emulsion polymerization, irradiation by high energy particulate matter (e.g., electron beams or gamma rays), and ultraviolet light (hereinafter "UV") photopolymerization. As explained below, however, there are disadvantages and/or limitations incurred with the use of each known process.

When utilizing psa's made by solution polymerization, elaborate drying ovens with massive exhaust ducts and high temperatures are required to carry away the volatile solvents after coating. Furthermore, to prevent the solvents from being vented to the atmosphere (with resulting pollution and solvent loss), expensive solvent recovery equipment has been necessary. Safety hazards in such operations are also severe, as the solvents are extremely flammable and precautions must be taken to avoid explosive mixtures in the oven and exhaust systems. A further limitation of the solvent based systems is the limit on the thickness of the coatings which can be deposited in one trip or pass through the coater. Thus, with coatings above about 5 mils, multiple coating layers must be deposited in successive trips through the coater to avoid blistering of the coating due to solvent evaporation.

While emulsion polymerization has eliminated the problems associated with the handling and evaporation of flammable solvents, the heat of vaporization must be supplied to remove the water from the coating and essentially the same equipment must be employed. Though higher solids coatings are possible, the higher heat of vaporization of water as compared to organic solvents offsets this benefit and about the same total energy for drying is required. Drying times are relatively long, thus limiting production. One of the most serious limitations of the emulsion polymerization process is the water sensitivity of the resulting polymers (caused by the emulsifying agent which is carried along in the process and becomes part of the final polymer). A further limitation of this process is that highly polar monomers, which are water miscible, are difficult to incorporate into the copolymer during polymerization and considerable homopolymerization of such monomers can occur in the aqueous phase.

Various attempts have been made to avoid the difficulties of the solution and emulsion polymerization processes. However, those have thus far resulted either in processing difficulties of their own or have produced polymers in which a proper balance between compliance and cohesive strength is very difficult to control.

More recently, development work has been done with polymerization processes which employ either ultraviolet light or electron beams. One patent which stresses electron beam curing is U.S. Pat. No. 3,897,295, in which the composition subject to the electron beam includes an acrylate monomer selected from a particular specified group, and a homopolymer or copolymer of a substance or substances selected from the same group. The polymer is dissolved in the monomer and the monomer is ultimately polymerized to bind the adhesive together.

The disadvantage of utilizing polymerization processes involving an electron beam, though, is that, generally, it is a rather indiscriminate polymerization process. In polymerization processes utilizing an electron beam, the particulate bombardment of the free-radically polymerizable monomers cannot be precisely controlled, with the result being chain scission of the developing polymer and an inability to control its molecular weight and crosslink density to the most desired range.

In order to avoid the above-discussed disadvantages incurred with the use of an electron beam, some have chosen to utilize a one step or stage low-intensity (e.g., 0.1 to 7 $mW/cm^2$) UV photopolymerization process. See, for example, U.S. Pat. No. 4,181,752. Whereas the use of relatively low intensity UV light is very desirable for building higher molecular weight acrylic psa's with good performance properties, an increase in the speed of the photopolymerization process would be desirable. However, if one attempts to increase the speed of the low intensity UV light-based process by increasing the amount of the photoinitiator employed (e.g., benzoin ethers, benzil ketals, etc.), then undesirable lower molecular weight polymers will be obtained. Furthermore, for thick adhesives an uneven polymerization from the front surface to the back surface of an irradiated adhesive composition occurs due to the uneven light absorption by the photopolymerization initiator resulting in a differential performance of the final psa product.

In view of the foregoing discussed disadvantages and limitations that exist with the use of conventional polymerization processes, improvements are continuously desired and sought by those within the industry. It was against this background that an improved polymerization or irradiation process for producing acrylic-based adhesives, and in particular acrylic-based psa tapes was sought.

SUMMARY OF THE INVENTION

By the present invention, we have now discovered that an increase in the speed of the photopolymerization process for the production of acrylic-based adhesives and acrylic-based psa tapes with acceptable product properties can be achieved by utilizing a multi-stage (as opposed to the conventional one-step) irradiation process, the first stage employing electromagnetic radiation at a relatively low intensity and the subsequent stage employing electromagnetic radiation at a relatively higher intensity.

Accordingly, the inventive multi-stage irradiation process for the production of an acrylic-based adhesive comprises the sequential steps of:

(a) forming a monomeric mixture or partially prepolymerized syrup comprising:

(i) 50–100 parts by weight of at least one acrylic acid ester of an alkyl alcohol, the alcohol containing from 1 to 14 carbon atoms;

(ii) 0–50 parts by weight of at least one copolymerizable monomer; and (iii) a photoinitiator;

(b) irradiating the resulting monomeric mixture or syrup with electromagnetic radiation of from 280 to 500 nanometer wavelength and from 0.01 to 20 mW/cm$^2$ average light intensity to effect conversion of from about 5–95 wt % of the monomeric mixture or partially prepolymerized syrup to an acrylic copolymer; and (c) thereafter, irradiating the acrylic copolymer resulting from step (b)) with electromagnetic radiation of from 280 to 500 nm wavelength and having an average light intensity of greater than 20 mW/cm$^2$ to at least substantially complete the photopolymerization reaction of the acrylic copolymer.

In another embodiment of the present invention, pressure-sensitive adhesive tapes are produced by coating the monomeric mixture or prepolymerized syrup onto a substrate and thereafter, irradiating the coated substrate as per steps (b) and (c) of the foregoing disclosed process.

In still other embodiments of the present invention, acrylic-based adhesives and psa tapes are provided which are produced by the foregoing disclosed, inventive processes.

The inventive multi-stage irradiation process does not have the limitations and drawbacks discussed earlier herein associated with conventional polymerization processes. The fact that the inventive process employs sequential irradiation steps or stages, one involving exposure to electromagnetic radiation at low average intensity and a subsequent stage or step involving exposure to electromagnetic radiation at a higher average intensity, is significant because the process is not only highly efficient, but it also produces an acrylic-based psa product having excellent properties, e.g. high shear strengths and adhesion values, as well as adhesive products and other articles which are not pressure-sensitive at room temperature.

Other aspects, advantages, and benefits of the present invention are apparent from the detailed disclosure, examples, and claims.

DETAILED DESCRIPTION OF THE INVENTION

In the first step of the inventive process, a photopolymerizable monomeric mixture or partially prepolymerized syrup is made by mixing together the components described below.

The photopolymerizable monomeric mixture comprises 50–100 parts by weight of at least one acrylic acid ester of an alkyl alcohol (preferably a non-tertiary alcohol), the alcohol containing from 1 to 14 (preferably 4 to 14) carbon atoms. Included within this class of monomers are, for example, isooctyl acrylate, isononyl acrylate, 2-ethyl-hexyl acrylate, decyl acrylate, dodecyl acrylate, n-butyl acrylate, methyl acrylate, and hexyl acrylate. Preferred monomers include isooctyl acrylate, isononyl acrylate, and butyl acrylate, and 2-ethyl-hexyl acrylate. The acrylic acid ester ("acrylate") is polymerized with 0–50 parts of at least one copolymerizable monomer which is typically an ethylenically unsaturated polar monomer such as, for example, acrylic acid, methacrylic acid, acrylamide, acrylonitrile, methacrylonitrile, N-substituted acrylamides, hydroxy acrylates, N-vinyl lactam, N-vinyl pyrrolidone, maleic anhydride, isobornyl acrylate, and itaconic acid.

In a preferred embodiment of the present invention, the viscosity of the monomer mixture is increased to a more desirable level so that it can be handled more conveniently during the coating process. In order to increase the viscosities to a more desirable level, the monomer mixtures can be partially prepolymerized. The prepolymerization can be accomplished by exposure to electromagnetic radiation (such as UV light) or by thermal polymerization. Other methods of increasing the viscosity of the monomer mixture are also available, however, such as the addition of viscosity modifying agents such as high molecular weight polymers or thixotropic agents such as colloidal silicas, etc. A syrup is a monomeric mixture thickened to a coatable viscosity.

If a psa tape is to be made, the monomeric mixture or prepolymerized syrup can be coated onto any suitable substrate (e.g., backing or liner) including, for example, films (transparent and non-transparent), cloths, papers, non-woven fibrous constructions, metal foils, and aligned filaments.

Afterwards, the monomeric mixture or partially prepolymerized syrup is photopolymerized by irradiating the same with electromagnetic radiation of 280 to 500 nanometer wavelength and 0.01 to 20 mW/cm$^2$ average light intensity to effect about 5–95% conversion of the monomeric mixture or prepolymerized syrup to an acrylate copolymer.

The irradiation for both stages is preferably carried out in the absence of oxygen. Thus, it is normally carried out in an inert atmosphere such as nitrogen, carbon dioxide, helium, argon, and the like. Air can also be excluded by sandwiching the liquid polymerizable mixture between layers of solid sheet material and irradiating through the sheet material. As will be appreciated by those skilled in the art, such material can have low adhesion surfaces and can be removed after polymerization is complete or one such surface can be a tape backing material. Preferably, the stages of irradiation are conducted continuously, or in-line without interruption of the polymerization process, i.e., the coated mixture is exposed to the first stage irradiation and then immediately exposed to the second stage irradiation with no interruption of the inert atmosphere between the stages.

Photoinitiators useful in the present invention include, but are not limited to, the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,2-propanedione-2-(O-ethoxycarbonyl) oxime, and the substituted triazines. Preferably, the photoinitiator is present in an amount of from about 0.01 part to about 5 parts, and most preferably, about 0.10 to 2 parts by weight, based upon 100 total parts by weight of monomer.

The photopolymerizable composition preferably contains a crosslinking agent to enhance the cohesive strength of the resulting adhesive or article. Useful crosslinking agents which also function as photoinitiators are the chromophore-substituted halomethyl-s-triazines disclosed in U.S. Pat. Nos. 4,330,590 and 4,329,384. Other suitable crosslinking agents include hydrogen abstracting carbonyls such as anthroquinone and benzophenone and their derivatives, as disclosed in U.S. Pat. No. 4,181,752, and polyfunctional acrylates such as 1,6-hexanedioldiacrylate, trimethylolpropane triacrylate and 1,2-ethylene glycol diacrylate, as well as those disclosed in U.S. Pat. No. 4,379,201.

Where a foam-like material or foam psa adhesive tape is desirable, a monomer blend comprising microbubbles may be used. The microbubbles may be glass or they may be polymeric. The microbubbles should have an average diameter of 10 to 200 micrometers, and comprise from about 5 to about 65 volume percent of the pressure-sensitive adhesive layer. Preferred glass microspheres have average diameters of about 50 micrometers. Especially preferred microspheres are polymeric microspheres, such as those disclosed in U.S. Pat. Nos. 3,615,972, 4,075,238, and 4,287,308.

The adhesives and psa tapes made by utilizing the processes of this invention may include cellular pressure-sensitive adhesive membranes as discussed in U.S. Pat. No. 4,415,615.

A foam-like or cellular psa membrane can be made by the process of the present invention. Typical psa thickness may range from 0.3 to 4 mm.

Other materials which can be blended with the polymerizable monomer mixture include fillers, tackifiers, foaming agents, antioxidants, plasticizers, reinforcing agents, dyes, pigments, fibers, fire retardants, and viscosity adjusting agents.

An especially useful filler material is hydrophobic silica as disclosed in U.S. Pat. Nos. 4,710,536 and 4,749,590. In one preferred embodiment of the present invention, the pressure-sensitive adhesive layer further comprises from about 2 to about 15 parts per hundred parts (phr) of a hydrophobic silica having a surface area of at least 10 $m^2/g$.

The extent of polymerization can be monitored by measuring the refractive index of the adhesive layer. Refractive index is a sensitive measure of the extent of polymerization and for these systems changes from about 1.4300 at the syrup stage to about 1.4700 at 100% reaction. The change in refractive index occurs linearly with conversion of acrylate unsaturation. This method is commonly applied in polymerization kinetics work. See, for example, discussions about the method in *Polymerization at Advanced Degrees of Conversion*, G. P. Gladyshev and K. M. Gibov, Keter Press, Jerusalem, 1970.

The subsequent irradiation is carried out at 280 to 500 nm wavelength and at a higher average intensity (as compared to the first stage irradiation step) within the range of greater than 20 $mW/cm^2$; preferably in the range of greater than 20 up to about 200 $mW/cm^2$; and most preferably in the range of about 50 $mW/cm^2$ to 150 $mW/cm^2$. During the second stage irradiation, the copolymerization reaction is at least substantially completed (i.e. preferably at least 95 wt % monomer conversion has been achieved as well as any crosslinking) thereby forming the acrylic copolymer. In some instances it is desirable to cool the adhesive coated web during both stages of irradiation, and especially during the second stage irradiation. This can be done by pulling the adhesive coated film over a cooling plate, by blowing cooled nitrogen on the web, or by blowing cooled air onto the aforementioned sandwich constructions.

The first stage of the irradiation uses low average intensity light (0.1–20 $mW/cm^2$) obtained from, but not limited to, fluorescent black lamps. The type of lamps that are useful in the practice of the invention depend upon the photoinitiator that is used. The lamps should emit radiation at wavelengths needed to activate the photoinitiator. For example, fluorescent black lamps having an output between 280–500 nm are useful. For convenience, fluorescent black lamps having an output between 300–400 nm are preferred. The subsequent polymerization step, utilizes an average light intensity of greater than 20 $mW/cm^2$ obtained from high pressure or medium pressure mercury, mercury xenon, or similar type doped lamps which operate at 100–600 watts/inch input power. Intensities of up to about 200 $mW/cm^2$ are feasible with the state of the art lamps. Higher intensities may be possible as advancements in bulb technology are made.

Each stage of irradiation can further include zones of varying intensities within the ranges specified, i.e., the first stage irradiation can include zones having varying low average intensity light, and the second stage can include zones having average light intensities greater than 20 $mW/cm^2$.

In addition to conducting the second stage polymerization with high intensity electromagnetic radiation, it is also feasible to utilize high energy particulate matter such as, for example, electron beams.

Utilizing the process of this invention substantial increases in processing speeds can be obtained while maintaining high performance psa properties.

The following non-limiting examples further illustrate the present invention. The test procedures used for evaluating the tapes of the Examples are given below.

Test Procedures

180° Peel

A sample is prepared by cutting an adhesive-coated polyethylene terephthalate film into a strip 2.54 cm by 15.2 cm. The strip is then laminated to a smooth stainless steel panel and rolled down with 2 passes of a 2.04 kg. hard rubber covered roller. The sample is left at room temperature for 15 minutes. The tape is then pulled away from the stainless steel panel at an angle of 180 degrees and a speed of 30.5 cm per minute on a tensile tester. Results are reported in Newtons/dm.

Static Shear

A sample is prepared by attaching a 2.54 cm wide by 15.2 cm long adhesive coated polyethylene terephthalate film strip to a smooth stainless steel panel that has been cleaned with heptane. The adhesive coated strip is overlapped onto the panel a distance of 2.54 cm so that the total contact area of the adhesive coated film on the stainless steel panel is 2.54 cm by 2.54 cm. The overlapped area is then rolled down with two passes of a 2.04 kg hard rubber covered roller. The panel is left at room temperature for 30 minutes.

For room temperature shear (RT), the panel is hung two degrees from the vertical plane to prevent peeling of the sample from the plate, and the free-hanging end of the adhesive coated strip is formed into a loop. A 500 or 1,000 gram weight is hung from the loop and a timer is started. The Static Shear Value is recorded in minutes. If no failure occurs after 10,000 minutes, the test is stopped.

If samples pass the room temperature static shear test, an elevated temperature test may be run. The panel is hung at two degrees from the vertical in an air circulating oven (that has been preheated to 700° C.) for 10 minutes to allow the sample to come up to temperature. A 500 or 1,000 gram weight is then hung on the loop and a timer is started. The Static Shear Value is recorded in minutes and the test is stopped if no failure occurs after 10,000 minutes.

T-Peel

A double coated tape sample is placed between two strips of 25 mm×200 mm×0.125 mm anodized aluminum, leaving an adhesive free 25 mm tab at each end of each aluminum strip. The assembly is rolled down with a 6.8 kg roller with one pass forward and one pass backward. The assembly is conditioned at room temperature for 1–2 hours. The tabs are bent back at 90° in opposite directions and respectively clamped in the upper and lower jaws of a tensile testing machine. The jaws are separated at 30 mm/minute. The force required to pull apart the tabs is recorded in Newtons/Decimeter (N/Dm).

The percentage (%) conversion is as described above using refractive index.

EXAMPLE 1

A mixture of 90 parts of isooctyl acrylate (IOA), 10 parts of acrylic acid (AA) and 0.04 parts of Irgacure™ 651 photoinitiator (2,2-dimethoxy-2-phenylacetophenone) was partially polymerized to a viscosity of about 3000 cps in a nitrogen atmosphere under ultraviolet radiation. To the partially polymerized mixture was added an additional 0.71 parts of Irgacure™ 651. The mixture was then knife coated to a thickness of 0.12 mm onto a 0.05 mm thick biaxially oriented poly(ethylene terephthalate) film and polymerized in a nitrogen atmosphere under a bank of fluorescent black light lamps (Sylvania F20T12BL) to a Stage 1 conversion of 42.4% using an average of 0.75 milliwatts/cm$^2$ of radiation for a total of 0.29 minutes. The energy from the lamps for the Stage 1 irradiation was measured with a Uvirad radiometer (Model No. UR365CH3) from E.I.T. (Electronic Instrumentation & Technology, Inc., Sterling, Va). The coated mixture was then exposed to a Stage 2 irradiation of an average of 109 mW/cm$^2$ of ultraviolet radiation (high intensity medium pressure mercury arc lamps set at 300 watts/inch) for 0.09 minutes to a conversion of over 95% to form a pressure sensitive adhesive. The intensity and energy from the lamps for the Stage 2 irradiation was measured with a Uvimap radiometer (Model No. UM365H-S) from E.I.T. The adhesive coated tape was tested for peel adhesion and static shear and the data is shown in Table 2. The test data shows that an acceptable pressure sensitive adhesive tape can be made as compared to 810 Magic™ Tape from Minnesota Mining & Manufacturing Company (Comparative Example C-1 in Table 3).

EXAMPLES 2–8

Pressure sensitive adhesives were prepared as in Example 1 except that various radiation intensities, and varying amounts of photoinitiator were added to the prepolymerized mixture to obtain varying Stage 1 conversions as shown below in Table 1. Stage 2 conversions are shown in Table 2 with test data for peel adhesion and static shear. The conversion after Stage 2 was greater than 95% in all cases. In all cases, acceptable pressure sensitive adhesive tapes were made.

TABLE 1

| Example | Parts Irg. 651 | Avg. UV Intensity, mW/cm$^2$ | Stage 1 Exposure Time - min. | Stage 1 Conversion, % |
|---|---|---|---|---|
| 2 | 0.14 | 1.5 | 1.11 | 90.9 |
| 3 | 0.14 | 1.5 | 0.83 | 77.1 |
| 4 | 0.50 | 0.75 | 0.53 | 70.3 |
| 5 | 0.75 | 0.75 | 0.44 | 58.0 |
| 6 | 0.75 | 0.75 | 0.36 | 49.2 |
| 7 | 1.00 | 0.75 | 0.17 | 39.5 |
| 8 | 1.00 | 0.75 | 0.17 | 39.5 |

TABLE 2

| Example | Stage 2 - Average Intensity, mW/cm$^2$ | Stage 2 Exposure Time- min | Total Exposure Time- min | 180° Peel Adhesion, N/dm | Static Shear** Minutes RT |
|---|---|---|---|---|---|
| 1 | 109 | 0.09 | 0.38 | 56 | 84 |
| 2 | 70 | 0.07 | 1.18 | 63 | 10,000+ |
| 3 | 118 | 0.09 | 0.91 | 36 | 572 |
| 4 | 109 | 0.08 | 0.61 | 30 | 1,012 |
| 5 | 109 | 0.09 | 0.53 | 39 | 302 |
| 6 | 109 | 0.09 | 0.45 | 46 | 179 |
| 7 | 118 | 0.21 | 038 | 101* | 10,000+ |
| 8 | 118 | 0.13 | 0.30 | 45 | 63 |

*Failure was cohesive, i.e. the adhesive layer split; all other samples failed adhesively between the adhesive and the stainless steel panel.
**A 1,000 gram weight was used.
+Over 10,000 minutes.

EXAMPLE 9

In this example an adhesive is prepared with a crosslinking agent to improve elevated temperature shear strength. A prepolymerized mixture was made as in Example 1. To this mixture was added an additional 0.71 parts of Irgacure™ 651 and 0.8 parts of 1,6-hexanediol diacrylate (HDDA) as a crosslinker. The mixture was coated and polymerized as described in Example 1 to a Stage 1 conversion of 42.4% and to a final conversion after Stage 2 of over 95% using an ultraviolet on average intensity of 109 mw/cm$^2$. The total reaction time of Stage 1 and Stage 2 was 0.38 min. Test results are shown in Table 3.

EXAMPLE 10

A pressure sensitive adhesive was made as described in Example 9 except that a triazine crosslinker was used instead of HDDA. To the prepolymerized mixture of Example 1 was added 0.10 parts of Irgacure™ 651 and 0.1 parts 2,4-bistrichloromethyl -6-(3,4-dimethoxyphenyl)-s-triazine. The average UV radiation intensity for Stage 1 was 1.5 mW/cm$^2$ for 0.56 minute. Stage 2 conditions and test data are shown in Table 3.

EXAMPLE 11

An adhesive was made as described in Example 9 except that a benzophenone type crosslinker was used. To the partially polymerized mixture of Example 1 was added 0.10 parts of Irgacure™ 651 and 0.15 parts of UVECRL P36, a benzophenone derivative acrylate from Radcure Specialties of Norfolk, Va. The Stage 1 polymerization was carried out using an average intensity of 1.5 mW/cm$^2$ lights for 1.11 minutes to obtain a Stage 1 conversion of 90%. The Stage 2 conditions and test results are shown in Table 3.

TABLE 3

| Example | Stage 2 Intensity, mW/cm$^2$ | Stage 2 Exposure Time- min | Total Exposure Time- min | 180° Peel Adhesion, N/dm | Static Shear* Minutes at 70° C. |
|---|---|---|---|---|---|
| 9 | 109 | 0.09 | 0.38 | 36 | 10,000+ |
| 10 | 70 | 0.07 | 0.63 | 41 | 10,000+ |
| 11 | 109 | 0.07 | 1.18 | 56 | 5,656 |
| C-1 | — | — | — | 17 | 240 |

*A 500 gram weight was used.

EXAMPLES 12–14

Pressure sensitive adhesive mixtures were prepared as described in Example 1 except that 0.8 part of 1,6-hexanedioldiacrylate (HDDA) was added to each mixture .

The mixtures were coated onto the release coated surface of a polyester film and the coated film was pulled over a cooling plate set at 30° F. in a chamber under a nitrogen atmosphere at the web speeds, in meters/min (m/min) shown in Table 4. The exposure times and intensities were those shown in Table 4. The Stage 1 average intensities were calculated from the energy measured with a Uvirad radiometer (from E.I.T.). The Stage 2 intensities were measured with a Uvimap radiometer (from E.I.T.). The adhesives were tested for 180° peel adhesion and static shear performance, and the results are shown in Table 5.

0.05 mm thick biaxially oriented poly(ethylene terephthalate) films that had been coated with a release coating, and irradiated according to the conditions shown in Table 6. The resulting foam-like sheet was made into a double coated tape by laminating acrylic pressure sensitive adhesives to each side of the sheet and tested for T-peel. Results are shown in Table 6.

In Example C-2, the films sandwiching the adhesive were pulled through UV lights as described in the Stage 1 conversion of Example 1. The lamps were adjusted to provide zones of 3 different intensities as shown in Table 6.

TABLE 4

| Example | Stage 1 average intensity mW/cm² | Stage 1 Exposure Time-min. | Stage 1 Conversion % | Stage 2 Average Intensity mw/cm² | Stage 2 Exposure Time-min. | Total Exposure Time-min | Web Speed m/min. |
|---|---|---|---|---|---|---|---|
| 12 | 0.70 | 0.11 | 30 | 25.2 | 0.15 | 0.26 | 0.47 |
| 13 | 0.7 | 0.071 | 20 | 25.4 | 0.09 | 0.16 | 0.74 |
| 14 | 0.7 | 0.036 | 15 | 45.5 | 0.05 | 0.086 | 1.48 |

TABLE 5

| Example | 180° Peel N/dm | Static Shear - 1000 gram wt - min @ RT | Static Shear - 500 gram wt - min @ 70° C. |
|---|---|---|---|
| 12 | 48 | 5001 | 10,000+ |
| 13 | 49 | 2933 | 10,000+ |
| 14 | 43 | 345 | 10,000+ |

The test results in Table 5 show that Stage 1 conversions of 15% can be used to make acceptable pressure sensitive adhesives.

The time in each zone is also shown. Lamps were used only on the top side of the adhesive. The T-peel results are shown in Table 6.

In Example 15, the films were pulled through Stage 1 as described in Comparative Example C-2, except with 2 zones providing the intensities shown in Table 6. The Stage 2 conversion was conducted using the high intensity mercury arc lamps described in Example 1. The exposure times and intensities, and the T-peel test results are shown in Table 6.

TABLE 6

| | Stage 1 Exposure | | | Stage 2 Exposure | | | |
|---|---|---|---|---|---|---|---|
| | Zone 1 | Zone 2 | Zone 3 | | | | |
| Example | Average Intensity-Time mW/cm2-min | Average Intensity-Time mW/cm2-min | Average Intensity-Time mW/cm2-min | Average Intensity mW/cm² | Time min | Total Exposure Time-min | T-Peel Results N/Dm |
| C-2 | 0.30-1.33 | 0.70-1.33 | 2.0-2.0 | none | none | 4.66 | 26 |
| 15 | 0.62-1.78 | 0.78-1.78 | none | 109.0 | 0.08 | 3.64 | 26 |

EXAMPLE 15 AND COMPARATIVE EXAMPLE C-2

An adhesive mixture was prepared by mixing 87.5 parts of isooctyl acrylate and 12.5 parts of acrylic acid with 0.04 parts of 2.2-dimethoxy-2-phenyl acetophenone photoinitiator (Irgacure™ 651). The mixture was partially polymerized under UV lights in a nitrogen atmosphere to form a syrup having a viscosity of about 3000 cps (Brookfield). An additional 0.1 phr (parts per hundred syrup) of Irgacure™ 651 photoinitiator was added to the mixture along with 0.056 phr of hexanedioldiacrylate, 8 phr glass microbubbles (C15/250 glass microbubbles available from Minnesota Mining & Manufacturing Co.), and 10 phr fumed silica (Aerosil™ 972 available from DeGussa). The mixture was mixed with a propellor mixer for about 10 minutes and degassed in a desiccator using a vacuum pump. The mixture was then coated to a thickness of about 1 mm between two The results in Table 6 show that the total exposure time can be reduced about 22% by using a high intensity Stage 2 cure, without sacrificing T-peel performance.

Reasonable modifications and variations are possible from the foregoing disclosure without departing from either the spirit or the scope of the present invention as defined by the claims.

We claim:
1. An adhesive made according to a multi-stage irradiation process for the production of an acrylic-based adhesive comprising the sequential steps of:
   (a) forming a solvent-free monomeric mixture or solvent-free partially prepolymerized syrup comprising:
      (i) 50–100 parts by weight of at least one acrylic acid ester of an alkyl alcohol, said alcohol containing from 1 to 14 carbon atoms;

(ii) 0–50 parts by weight of at least one copolymerizable monomer; and
(iii) a photoinitiator;
(b) irradiating the resulting monomeric mixture or partially prepolymerized syrup with electromagnetic radiation of from 280 to 500 nanometers wavelength and from 0.01 to 20 milliwatts per centimeter squared (mW/cm$^2$) average light intensity to effect conversion of from about 5–95 wt % of said monomeric mixture or partially prepolymerized syrup to an acrylic copolymer; and
(c) thereafter, further irradiating the acrylic copolymer resulting from step (b) with electromagnetic radiation of from 280 to 500 nm wavelength and having an average light intensity of greater than 20 mW/cm$^2$ to at least substantially complete the polymerization reaction of said acrylic copolymer.

2. A pressure-sensitive adhesive tape made according to a multi-step irradiation process for the production of an acrylic-based pressure-sensitive adhesive tape comprising the sequential steps of:
(a) coating onto at least one side of a suitable substrate a photopolymerizable solvent-free monomeric mixture or solvent-free partially prepolymerized syrup comprising:
(i) 50–100 parts by weight of at least one acrylic acid ester of an alkyl alcohol, said alcohol containing from 1 to 14 carbon atoms;
(ii) 0–50 parts by weight of at least one copolymerizable monomer; and
(iii) a photoinitiator;
(b) irradiating the resulting coated substrate with electromagnetic radiation of from 280 to 500 nanometers wavelength and from 0.01 to 20 milliwatts per centimeter squared (mW/cm$^2$) average light intensity to effect about 5%–95% conversion of said monomeric mixture or partially prepolymerized syrup to an acrylic copolymer; and
(c) thereafter, irradiating the partially polymerized coated substrate resulting from step (b) with electromagnetic radiation of from 280 to 500 nm wavelength and having an average light, intensity of greater than 20 mW/cm$^2$ to at least substantially complete the polymerization reaction of said acrylic copolymer.

3. The adhesive according to claim 1 wherein said at least one acrylic acid ester is an ester of a non-tertiary alcohol, said alcohol containing from 1 to 14 carbon atoms, and said at least one copolymerizable monomer is an ethylenically unsaturated polar monomer.

4. The adhesive according to claim 1 wherein said at least one acrylic acid ester is selected from 2-ethyl-hexyl acrylate, isooctyl acrylate, isononyl acrylate, and butyl acrylate.

5. The adhesive according to claim 1 wherein said at least one copolymerizable monomer is selected from acrylic acid, methacrylic acid, acrylamide, acrylonitrile, methacrylonitrile, N-substituted acrylamides, hydroxyacrylates, N-vinyl pyrrolidone, N-vinyl caprolactam, maleic anhydride, isobornyl acrylate, and itaconic acid.

6. The adhesive according to claim 1, wherein said photoinitiator is present in an amount of from about 0.01 to 5 parts by weight.

7. The adhesive according to claim 1 wherein said photoinitiator is present in an amount of from about 0.10 to 2 parts by weight.

8. The adhesive according to claim 1 wherein said monomeric mixture or prepolymerized syrup further comprises a crosslinking agent.

9. A The adhesive according to claim 8 wherein said crosslinking agent comprises a triazine, benzophenone, or a substituted benzophenone.

10. The adhesive according to claim 9 wherein said crosslinking agent comprises a trihalomethyl-s-triazine.

11. The adhesive according to claim 8 wherein said crosslinking agent comprises a multi-functional acrylate.

12. The adhesive according to claim 1 wherein said percent conversion in step (b) is from about 10%–95%.

13. The adhesive according to claim 1 wherein said percent conversion in step (b) is from about 40%–95%.

14. The adhesive according to claim 1 wherein said average light intensity in step (c) is in the range of greater than 20 up to 200 mW/cm$^2$.

15. The adhesive according to claim 1 wherein said average light intensity in step (c) is in the range of 50 to 150 mW/cm$^2$.

16. The adhesive according to claim 1 wherein said acrylic-based reaction mixture is cooled during the irradiating steps in (b) and (c).

17. The adhesive according to claim 1 wherein said multi-stage irradiation process is continuous without interruption.

18. The adhesive according to claim 1 wherein said multi-stage irradiation process is conducted under inert conditions.

19. The adhesive according to claim 18 wherein said acrylic-based reaction mixtures in both the first and second stage irradiating steps are positioned between layers of solid sheet material that are transparent to electromagnetic radiation having a wavelength in the range of 280 to 500 nanometers.

20. The tape according to claim 2 wherein said percent conversion in step (b) is about 10 %–95%.

21. The tape according to claim 2 wherein said percent conversion in step (b) is from about 40%–95%.

22. The tape according to claim 2 wherein said average light intensity in step (c) is in the range of greater than 20 up to 200 mW/cm$^2$.

23. The tape according to claim 2 wherein said average light intensity in step (c) is in the range of 50 to 150 mW/cm$^2$.

* * * * *

UNITED STATES PATENT AND TRADEMARK OFFICE
CERTIFICATE OF CORRECTION

PATENT NO.    : 6,436,532 B1
DATED         : August 20, 2002
INVENTOR(S)   : Moon, John D.

It is certified that error appears in the above-identified patent and that said Letters Patent is hereby corrected as shown below:

Title page,
Item [56], FOREIGN PATENT DOCUMENTS, insert -- JP 3-250081 11/1991 --.

Column 8,
Line 26, delete "on" and insert in place thereof -- radiation --;

Column 12,
Line 14, delete the "A" following "9." and preceeding "The".

Signed and Sealed this

Twenty-seventh Day of May, 2003

JAMES E. ROGAN
*Director of the United States Patent and Trademark Office*